United States Patent
Zaffetti et al.

(10) Patent No.: US 11,530,878 B2
(45) Date of Patent: Dec. 20, 2022

(54) SPIRAL TUBE HEAT EXCHANGER

(71) Applicant: Hamilton Sundstrand Corporation, Charlotte, NC (US)

(72) Inventors: Mark A. Zaffetti, Suffield, CT (US); Jeremy M. Strange, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 562 days.

(21) Appl. No.: 15/092,736

(22) Filed: Apr. 7, 2016

(65) Prior Publication Data

US 2017/0292791 A1    Oct. 12, 2017

(51) Int. Cl.
| | |
|---|---|
| F28D 7/02 | (2006.01) |
| F28F 7/02 | (2006.01) |
| F28D 7/00 | (2006.01) |
| F28F 9/02 | (2006.01) |
| B23P 15/26 | (2006.01) |
| F28F 13/08 | (2006.01) |

(52) U.S. Cl.
CPC .............. *F28D 7/022* (2013.01); *B23P 15/26* (2013.01); *F28D 7/0033* (2013.01); *F28F 7/02* (2013.01); *F28F 9/02* (2013.01); *F28F 9/0202* (2013.01); *F28F 9/026* (2013.01); *F28F 13/08* (2013.01); *F28F 2009/0287* (2013.01); *F28F 2009/0297* (2013.01); *F28F 2210/08* (2013.01)

(58) Field of Classification Search
CPC ........ F28D 7/022; F28D 7/0033; B23P 15/26; F28F 9/0202; F28F 2009/0287
See application file for complete search history.

(56) References Cited

U.S. PATENT DOCUMENTS

| | | | |
|---|---|---|---|
| 1,965,553 A | 7/1934 | Lear | |
| 4,451,960 A * | 6/1984 | Molitor | B21D 53/027 165/165 |
| 4,600,052 A * | 7/1986 | Wood, III | F28F 7/00 165/165 |
| 4,785,879 A * | 11/1988 | Longsworth | F25B 9/02 165/147 |
| 5,228,505 A | 7/1993 | Dempsey | |
| 5,423,378 A * | 6/1995 | Dillenbeck | F28D 7/04 165/162 |
| 7,597,136 B2 | 10/2009 | Kite et al. | |

(Continued)

FOREIGN PATENT DOCUMENTS

| | | |
|---|---|---|
| CN | 102798302 A | 11/2012 |
| DE | 102012108427 A1 | 3/2014 |

(Continued)

OTHER PUBLICATIONS

European Search Report Issued in EP Application No. 17165197.9, dated Sep. 8, 2017, 10 Pages.

*Primary Examiner* — Nael N Babaa
(74) *Attorney, Agent, or Firm* — Cantor Colburn LLP

(57) ABSTRACT

A heat exchanger includes a first fluid pathway enclosed in a heat exchanger body to convey a first fluid through the heat exchanger body and a second fluid pathway enclosed in the heat exchanger body to convey a second fluid through the heat exchanger body and facilitate thermal energy exchange between the first fluid and the second fluid. The first fluid pathway and the second fluid pathway together are arranged in a spiral arrangement extending along a central axis of the heat exchanger.

5 Claims, 4 Drawing Sheets

(56) References Cited

U.S. PATENT DOCUMENTS

| | | |
|---|---|---|
| 9,134,072 B2 | 9/2015 | Roisin et al. |
| 2006/0133989 A1* | 6/2006 | Sarracini ............... F28D 1/0213 423/613 |
| 2007/0137275 A1* | 6/2007 | Hansen ................. B21D 53/06 72/133 |
| 2007/0224565 A1* | 9/2007 | Briselden ............... F23C 3/002 431/207 |
| 2010/0101506 A1 | 4/2010 | Furui et al. |
| 2010/0300663 A1 | 12/2010 | Tso et al. |
| 2017/0219291 A1* | 8/2017 | Leemans ................ B23P 15/26 |

FOREIGN PATENT DOCUMENTS

| | | |
|---|---|---|
| EP | 3124906 A1 | 2/2017 |
| EP | 3193125 A1 | 7/2017 |
| WO | 2010125017 A1 | 11/2010 |

* cited by examiner

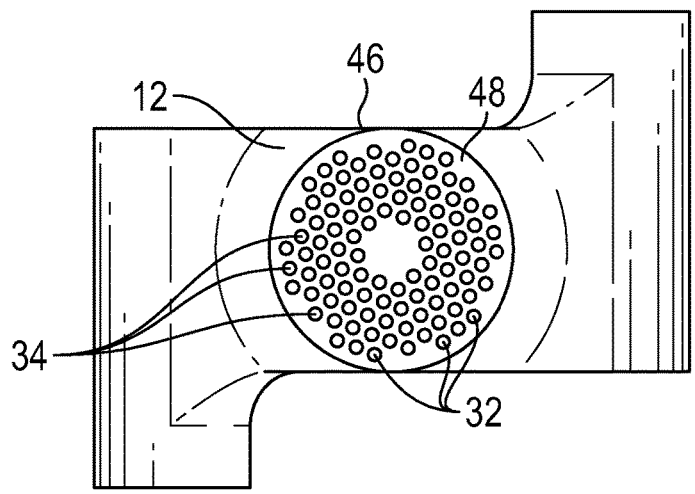
FIG. 4
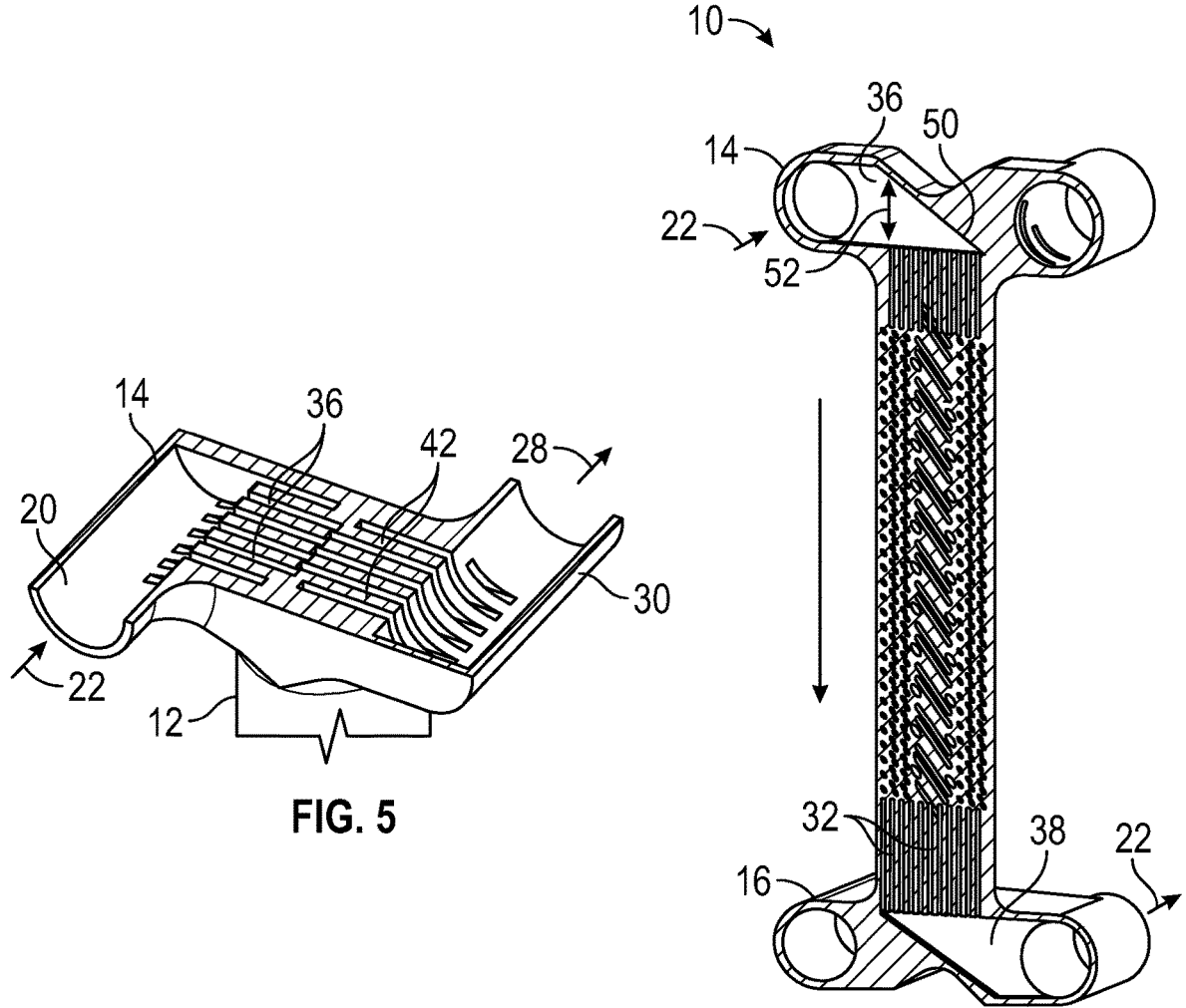
FIG. 5
FIG. 6

SPIRAL TUBE HEAT EXCHANGER

BACKGROUND

The subject matter disclosed herein relates to heat exchangers. More specifically, the present disclosure relates to tubing arrangements for heat exchangers.

Many industries and applications utilize heat exchangers to facilitate thermal energy exchange between fluids. One type of heat exchanger is a tube and tube heat exchanger in which a first fluid flowing through a first passage exchanges thermal energy with a second fluid flowing through a second passage in close proximity with the first tube.

Tube and tube heat exchangers, however, are limited in thermal performance in a given envelope or volume, or "whetted area" by current manufacturing methods, which restrict size and geometry of the passages for fluid flow.

SUMMARY

In one embodiment, a heat exchanger includes a first fluid pathway enclosed in a heat exchanger body to convey a first fluid through the heat exchanger body and a second fluid pathway enclosed in the heat exchanger body to convey a second fluid through the heat exchanger body and facilitate thermal energy exchange between the first fluid and the second fluid. The first fluid pathway and the second fluid pathway together are arranged in a spiral arrangement extending along a central axis of the heat exchanger.

Additionally or alternatively, in this or other embodiments the heat exchanger includes a plurality of first fluid pathways and a plurality of second fluid pathways. The first fluid pathways together with the second fluid pathways are arranged in the spiral arrangement.

Additionally or alternatively, in this or other embodiments the first fluid pathways and the second fluid pathways are arranged in rows of first fluid pathways alternating with rows of second fluid pathways across the heat exchanger.

Additionally or alternatively, in this or other embodiments a first header is located at a first end of the heat exchanger body. The first header includes a plurality of first header pathways to connect a first port to the plurality of first fluid pathways and a plurality of second header pathways to connect a second port to the plurality of second fluid pathways.

Additionally or alternatively, in this or other embodiments a second header is located at a second end of the heat exchanger body.

Additionally or alternatively, in this or other embodiments the first fluid pathway and the second fluid pathway are separated by a thickness of heat exchanger body material.

Additionally or alternatively, in this or other embodiments a helix angle of one or more of the first fluid pathway and the second fluid pathway varies along the central axis.

Additionally or alternatively, in this or other embodiments one or more of the first fluid pathway and the second fluid pathway have a circular cross-section.

Additionally or alternatively, in this or other embodiments a cross-sectional shape of one or more of the first fluid pathway and the second fluid pathway vary along the central axis.

Additionally or alternatively, in this or other embodiments the first fluid flow through first fluid pathway is in a first direction along the central axis, and the second fluid flow through the second fluid pathway is in a second direction along the central axis, opposite the first direction.

Additionally or alternatively, in this or other embodiments the heat exchanger is formed as a single unitary element.

Additionally or alternatively, in this or other embodiments the heat exchanger is formed via an additive manufacturing process.

In another embodiment, a method of operating a heat exchanger includes urging a first fluid through a first fluid pathway extending through a heat exchanger body. The first fluid pathway has a first spiral path along a central axis of the heat exchanger body. A second fluid is urged through a second fluid pathway extending through the heat exchanger body. The second fluid pathway has a second spiral path along the central axis spaced from the first fluid pathway by a thickness of heat exchanger body material. Thermal energy is exchanged between the first fluid and the second fluid at the heat exchanger body.

Additionally or alternatively, in this or other embodiments the first fluid is urged along the first fluid pathway in a first direction along the central axis, and the second fluid is urged along the second fluid pathway in a second direction opposite the first direction.

Additionally or alternatively, in this or other embodiments the first fluid is urged through a plurality of first fluid pathways and the second fluid is urged through a plurality of second fluid pathways.

Additionally or alternatively, in this or other embodiments the first fluid and the second fluid are urged through a first header fluidly connected to the plurality of first fluid pathways and the plurality of second fluid pathways.

Additionally or alternatively, in this or other embodiments the heat exchanger is formed as a single unitary element.

Additionally or alternatively, in this or other embodiments the heat exchanger is formed via an additive manufacturing process.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 4 is a cross-sectional view through a heat exchanger body of an embodiment of a tube heat exchanger;

FIG. 5 is a cross-sectional view of a header of an embodiment of a tube heat exchanger; and FIG. 6 is another cross-sectional view along a length of an embodiment of a tube heat exchanger.

DETAILED DESCRIPTION

Figure 1:
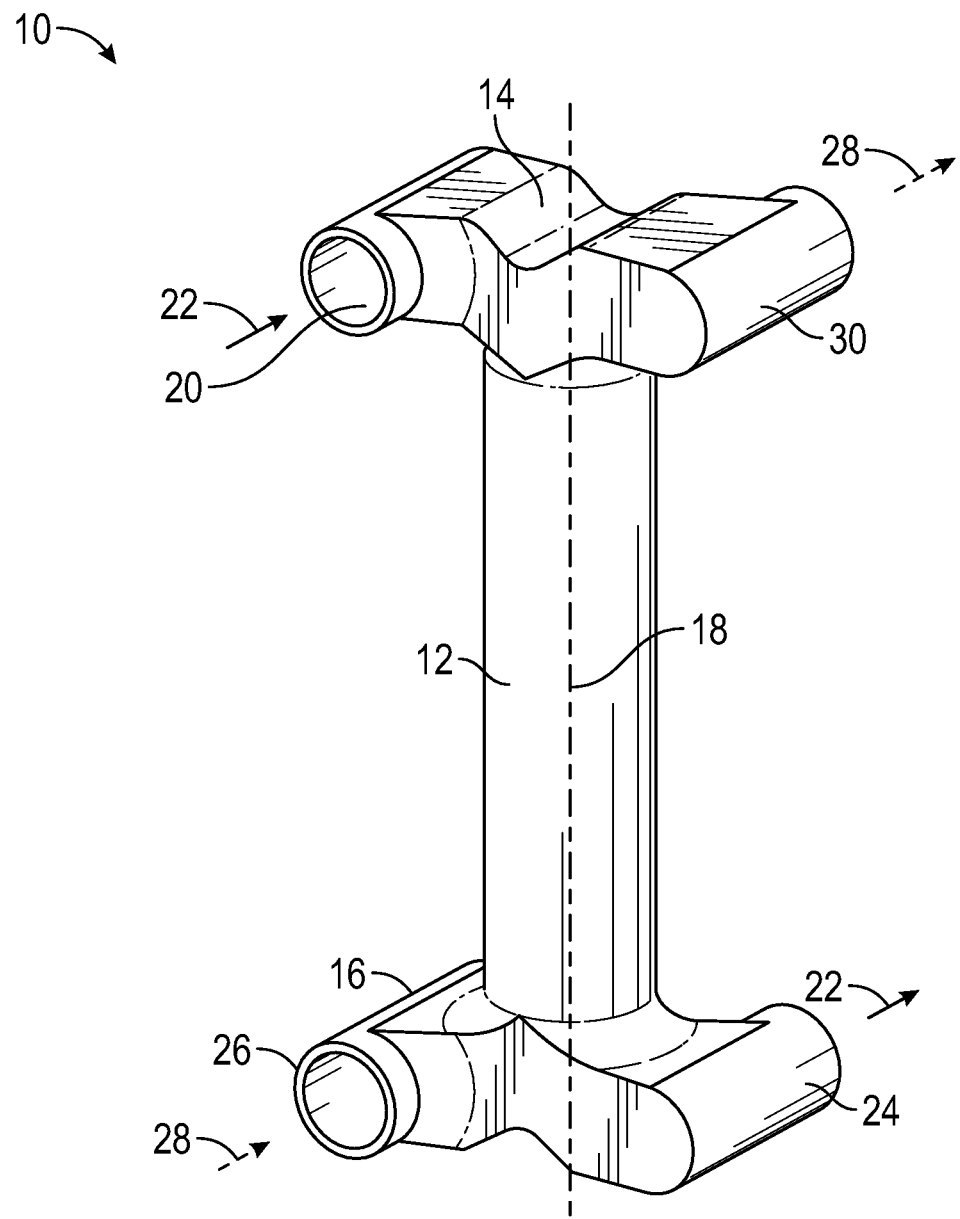
FIG. 1 is a perspective view of an embodiment of a counterflow tube heat exchanger.

Referring now to FIG. 1, shown is an embodiment of a tube heat exchanger 10. The tube heat exchanger 10 includes a heat exchanger body 12, and a first header 14 and a second header 16 located at opposing ends of the heat exchanger body 12. In some embodiments, the heat exchanger body 12 is cylindrical in shape with a circular cross-section, extending along a central axis 18. It is to be appreciated that, in other embodiments, the heat exchanger body 12 may have other cross-sectional shapes, for example curvilinear, polygonal or a combination thereof. In the embodiment of FIG. 1, a counterflow tube heat exchanger 10 is shown. The first header 14 includes a first inlet port 20 for a first fluid flow 22. The first fluid flow 22 proceeds through the heat exchanger body 12 as will be described in more detail below to the second header 16, which includes a first outlet port 24 for the first fluid flow 22. The second header 16 further includes a second inlet port 26 for a second fluid flow 28, which flows through the heat exchanger body 12 to the first header 14. The first header 14 includes a second outlet port 30 for outlet of the second fluid flow 28 from the first header 14.

Figure 2:
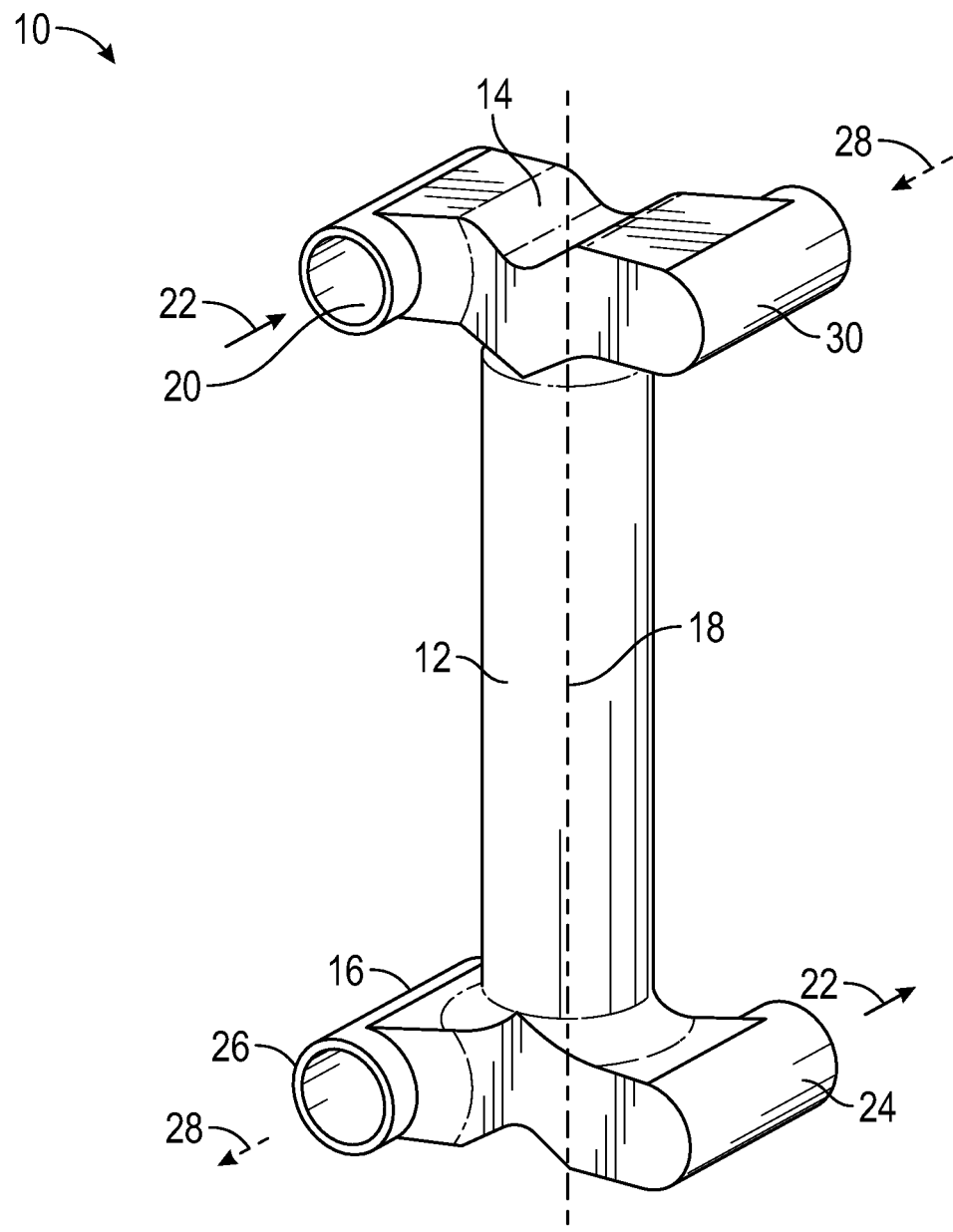
FIG. 2 is a perspective view of an embodiment of a parallel tube heat exchanger.

FIG. 2 illustrates an embodiment of a parallel flow tube heat exchanger 10. In the embodiment of FIG. 2, the first header 14 includes the first inlet port 20 and the second inlet port 30, through which the first fluid flow 22 and the second fluid flow 28, respectively, enter the tube heat exchanger 10. The second header 16 includes the first outlet port 24 and the second outlet port 26 through which the first fluid flow 22 and the second fluid flow 28, respectively, exit the tube heat exchanger 10.

Figure 3:
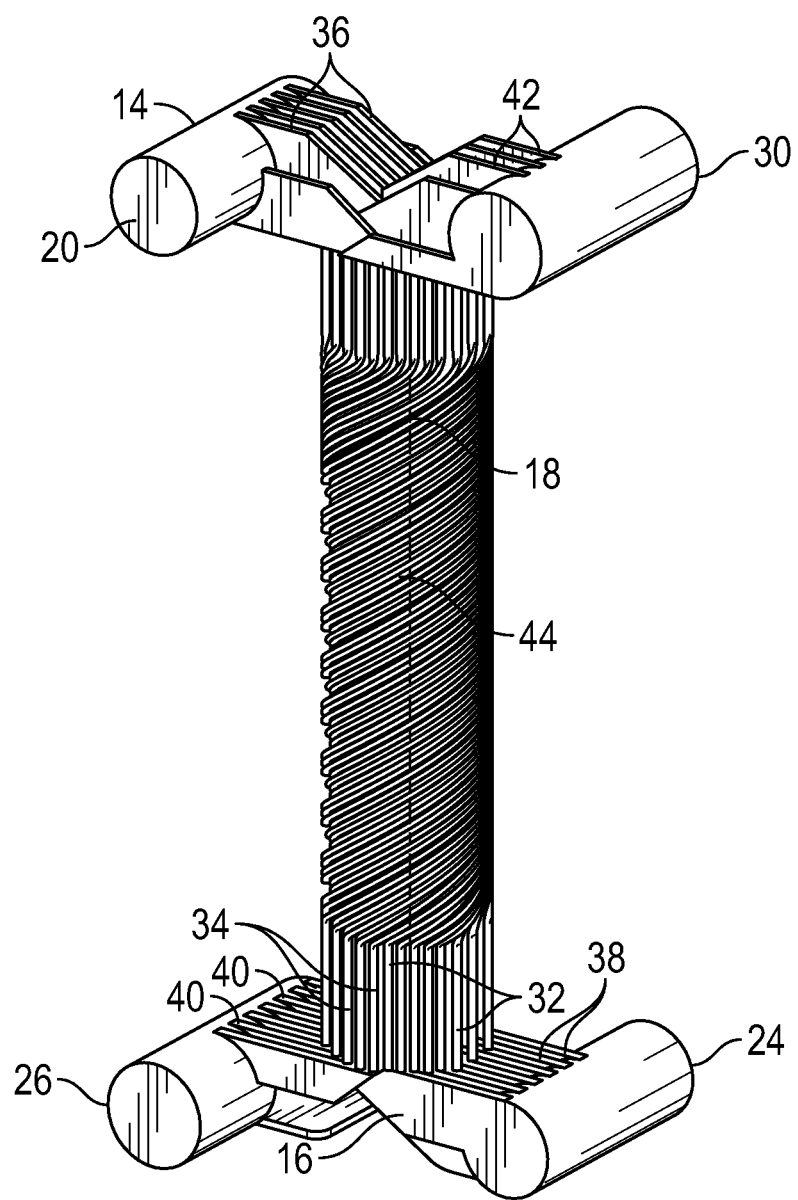
FIG. 3 is a perspective view of the internal fluid volume of an embodiment of a tube heat exchanger.

While the description that follows is primarily in the context of a counterflow tube heat exchanger 10, one skilled in the art will readily appreciate that the features disclosed may be readily applied to a parallel flow tube heat exchanger 10. Referring now to FIG. 3, shown is a schematic of fluid flow pathways through the tube heat exchanger 10. FIG. 3 shows two sets of fluid pathways, including a plurality of first fluid pathways 32 to convey the first fluid flow 22 through the tube heat exchanger 10 and a plurality of second fluid pathways 34 to convey the second fluid flow 28 through the tube heat exchanger 10. The fluid pathways 32, 34 are connected to first header 14 and second header 16. The first header 14 includes a plurality of first header inlet pathways 36 to connect the first inlet port 20 to the plurality of first fluid pathways 32, with the first fluid pathways 32 also connected to the second outlet port 24 via a plurality of second header outlet pathways 38 at the second header 16. Similarly, the second header 16 includes a plurality of second header inlet pathways 40 to connect the second inlet port 26 to the plurality of second fluid pathways 34, with the second fluid pathways 34 also connected to the first outlet port 30 via a plurality of first header outlet pathways 42 at the first header 14.

The first fluid pathways 32 and the second fluid pathways 34 are arranged in a spiral or helical pattern along the central axis 18 to increase the lengths and enhance heat transfer characteristics of fluid pathways 32, 34 that are present in the tube heat exchanger 10, compared to a tube heat exchanger having linear fluid pathways extending along central axis. This results in a more compact tube heat exchanger 10, with improved thermal exchange performance per unit of axial length between the first header 14 and the second header 16. The use of multiple, relatively small fluid pathways 32, 34 reduces a volume of fluid present in each fluid pathway 32, 34 thus further improving thermal energy transfer between first fluid pathways 32 and second fluid pathways 34. As shown in FIG. 3, in some embodiments a helix angle 44 of the fluid pathways 32, 34 relative to the central axis 18 is constant along a length of the heat exchanger body 12, while in other embodiments the helix angle 44 may vary.

Referring now to FIG. 4, the heat exchanger body 12 includes an outer surface 46 with the plurality of fluid pathways 32, 34 located inboard of the outer surface 46, relative to the central axis 18. In some embodiments, the heat exchanger body 12 is a unitary element with openings defining the fluid pathways 32, 34 extending therethrough, surrounded by and separated by a thickness of body material 48. As shown, the fluid pathways 32 and 34 are arranged in alternating rows across the heat exchanger body 12, such that a row of first fluid pathways 32 is adjacent to a row of second fluid pathways 34. In some embodiments, the fluid pathways 32,34 are circular in cross-section as shown, but one skilled in the art will readily appreciate that other cross-sections, such as oval or elliptical, may be utilized. Further, while in FIG. 4 first fluid pathways 32 and second fluid pathways are illustrated as being equal in cross-sectional area, in some embodiments it may be desired for the cross-sectional areas of first fluid pathways 32 and second fluid pathways 34 to be unequal. In the embodiment of FIG. 4, a quantity of first fluid pathways 32 equals a quantity of second fluid pathways 34, but in other embodiments the quantities may differ to achieve a desired thermal energy transfer.

Referring now to FIG. 5, shown is a cross-sectional view of an exemplary header 14. While header 14 is shown, one skilled in the art will readily appreciate that header 16 is similarly constructed. First inlet port 20 is connected to a plurality of first header inlet pathways 36 to allow the first fluid flow 22 to be distributed from the first inlet port 20 to the plurality of first header inlet pathways 36. Similarly, the second outlet port 30 is similarly connected to the plurality of first header outlet pathways 42 to collect the second fluid flow 28 from the first header outlet pathways 42 into the second outlet port 30.

FIG. 6 is a cross-sectional view through a first header inlet pathway 36. The first header inlet pathway 36 is connected to multiple first fluid pathways 32 to distribute the first fluid flow 22 thereto. Similarly, each second header outlet pathway 38 is connected to multiple first fluid pathways 32 to collect the first fluid flow 22 therefrom. Each header pathway 36, 38 includes a pathway wall 50 to direct fluid flow to and from first fluid pathways 32, with the pathway wall 50 shaped and oriented to equalize fluid mass flow rates to and from each of the first fluid pathways 32. As shown in FIG. 6, the pathway wall 50 may be linear, tapering a pathway width 52 with increasing distance from the first inlet port 20. In other embodiments, the pathway wall 50 may follow a curvilinear path, a parabolic path, or the like. While the configuration of header pathway 36 is described above, one skilled in the art will readily appreciate that the description may be applied to other header pathways 34, 40, 42 (shown in FIG. 3) of tube heat exchanger 10.

The tube heat exchanger 10 may be formed through a number of manufacturing methods, such as additive manufacturing, which enables the helical arrangement of first fluid pathways 32 and second fluid pathways 34 and the headers 14, 16. The tube heat exchanger 10 may be formed as a single-piece unitary structure, or may be formed as separate elements joined together at a secondary operation. For example, entire tube exchanger 10 may be formed via a single additive manufacturing process, or heat exchanger body 12, first header 14 and second header 16 may be formed separately and subsequently joined by, for example, brazing, adhesive bonding or other method.

In operation of the tube heat exchanger 10, the first fluid flow 22 enters the first inlet port 20 and passes through the plurality of first header inlet pathways 36 to be distributed to the first fluid pathways 32. The first fluid flow 22 continues through the first fluid pathways 32 and into the second header outlet pathways 38. The first fluid flow 22 is then collected at the first outlet port 24 and exits the tube heat exchanger 10. Similarly, the second fluid flow 28 enters the second header 16 at the second inlet port 26 and flows through the plurality of second header inlet pathways 40 and is distributed to the second fluid pathways 34. As second fluid flow 28 continues through the second fluid pathways 34, thermal energy is exchanged with the first fluid flow 22 through the first fluid pathways 32. The second fluid flow 28 proceeds to the second header outlet pathways 42 and is collected at the second header outlet port 30 to exit the tube heat exchanger 10. In the embodiments described as counterflow heat exchangers 10, the first fluid flow 22 flows in a first axial direction through first fluid pathways 32 while second fluid flow 28 flows through second fluid pathways 34 in a second axial direction opposite the first axial direction. Alternatively, in embodiments described as parallel flow tube heat exchangers 10, first fluid flow 22 and second fluid flow 28 flow in the same axial direction through respective fluid pathways 32, 34.

The arrangement of first fluid pathways 32 and second fluid pathways 34 enclosed in tube exchanger 10 allow for increased thermal energy transfer length over a selected axial length of tube heat exchanger, relative to a conventional straight-tube configuration. Further, the shape and spacing of the pathways may be tuned along the length of tube heat exchanger 10 to achieve a desired thermal energy transfer performance.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A heat exchanger comprising:
   a plurality of first fluid pathways enclosed in a cylindrical heat exchanger body to convey a first fluid through the heat exchanger body;
   a plurality of second fluid pathways enclosed in the heat exchanger body to convey a second fluid through the heat exchanger body and facilitate thermal energy exchange between the first fluid and the second fluid;
   a first fluid inlet operably connected to the plurality of first fluid pathways and oriented perpendicular to a central axis of the heat exchanger;
   a second fluid inlet operably connected to the plurality of second fluid pathways and oriented perpendicular to the central axis;
   a first header disposed at a first end of the heat exchanger body, the first header including:
      a plurality of first header pathways extending radially outwardly from the body portion to connect a first port to the plurality of first fluid pathways; and
      a plurality of second header pathways extending radially outwardly from the body portion to connect a second port to the plurality of second fluid pathways;
   wherein the first fluid inlet and the second fluid inlet are disposed at a same axial end of the heat exchanger, and on opposite lateral sides of the heat exchanger;
   wherein the plurality of first fluid pathways and the plurality of second fluid pathways are together arranged in a spiral arrangement extending along the central axis of the heat exchanger defined by spiral portions of the plurality of first fluid pathways and the plurality of second fluid pathways;
   wherein the heat exchanger body is a unitary element with openings defining the plurality of first fluid pathways and the plurality of second fluid pathways extending therethrough, surrounded by and separated by a thickness of body material, the body material defining an inner wall of each of the plurality of first fluid pathways and the plurality of second fluid pathways and
   wherein a helix angle of one or more of the plurality of first fluid pathways and the plurality of second fluid pathways in the cylindrical body portion varies along the central axis;
   wherein the plurality of first fluid pathways and the plurality of second fluid pathways are arranged in a repeating arrangement of rows of the plurality of first fluid pathways alternating with rows of the plurality of second fluid pathways across the heat exchanger relative to the central axis.

2. The heat exchanger of claim 1, further comprising a second header disposed at a second end of the heat exchanger body.

3. The heat exchanger of claim 1, wherein one or more of the plurality of first fluid pathways and the plurality of second fluid pathways have a circular cross-section.

4. The heat exchanger of claim 1, wherein a cross-sectional shape of one or more of the plurality of first fluid pathways and the plurality of second fluid pathways vary along the central axis.

5. The heat exchanger of claim 1, wherein the heat exchanger is formed via an additive manufacturing process.

* * * * *